C. H. NOBLE.

AUTOMOBILE SIGNAL.

APPLICATION FILED NOV. 9, 1921.

1,424,374.

Patented Aug. 1, 1922.

Inventor

C. H. Noble,

By Watson E. Coleman

Attorney

UNITED STATES PATENT OFFICE.

CHARLES H. NOBLE, OF BAD AXE, MICHIGAN.

AUTOMOBILE SIGNAL.

1,424,374. Specification of Letters Patent. Patented Aug. 1, 1922.

Application filed November 9, 1921. Serial No. 514,030.

*To all whom it may concern:*

Be it known that I, CHARLES H. NOBLE, a citizen of the United States, residing at Bad Axe, in the county of Huron and State of Michigan, have invented certain new and useful Improvements in Automobile Signals, of which the following is a specification, reference being had to the accompanying drawings.

It is the purpose of the present invention to provide a signal for use on automobiles, especially adapted for attachment on the top of the cover thereof, for signalling to the chauffeurs of automobiles in the rear, as to whether or not the chauffeur of the automobile in front intends to turn to the right or the left or stop.

However, the present signal is designed namely for indicating danger, by disclosing the red signal, conveying the fact to the chauffeur of the automobile in the rear that the chauffeur of the automobile in front intends to slow up or stop.

Another purpose consists in the provision of a signal of this character wherein a metal tube is employed, containing a pliable red signal mounted upon a spring tensioned roller, so that when the signal is lowered and exposed, it will automatically rewind into the tubular housing or casing, when the actuating means is released.

Still another purpose is the provision of a signal of this character, including improved means for actuating the pliable danger signal, so as to expose the same. In fact it is the design of the present invention to operate the danger signal by hand.

While the design and construction at present illustrated and set forth are deemed preferable, it is obvious that as a result of a reduction of the invention to a more practical form for commercial purposes, the invention may be susceptible of changes, and the right to these changes is claimed, provided they are comprehended within the scope of what is claimed.

The invention comprises further features and combination of parts, as will be hereinafter set forth, shown in the drawings and claimed.

In the drawings:—

Figures 1, 2, 3, 4, 5, 6, 7, 8, 9, 10:
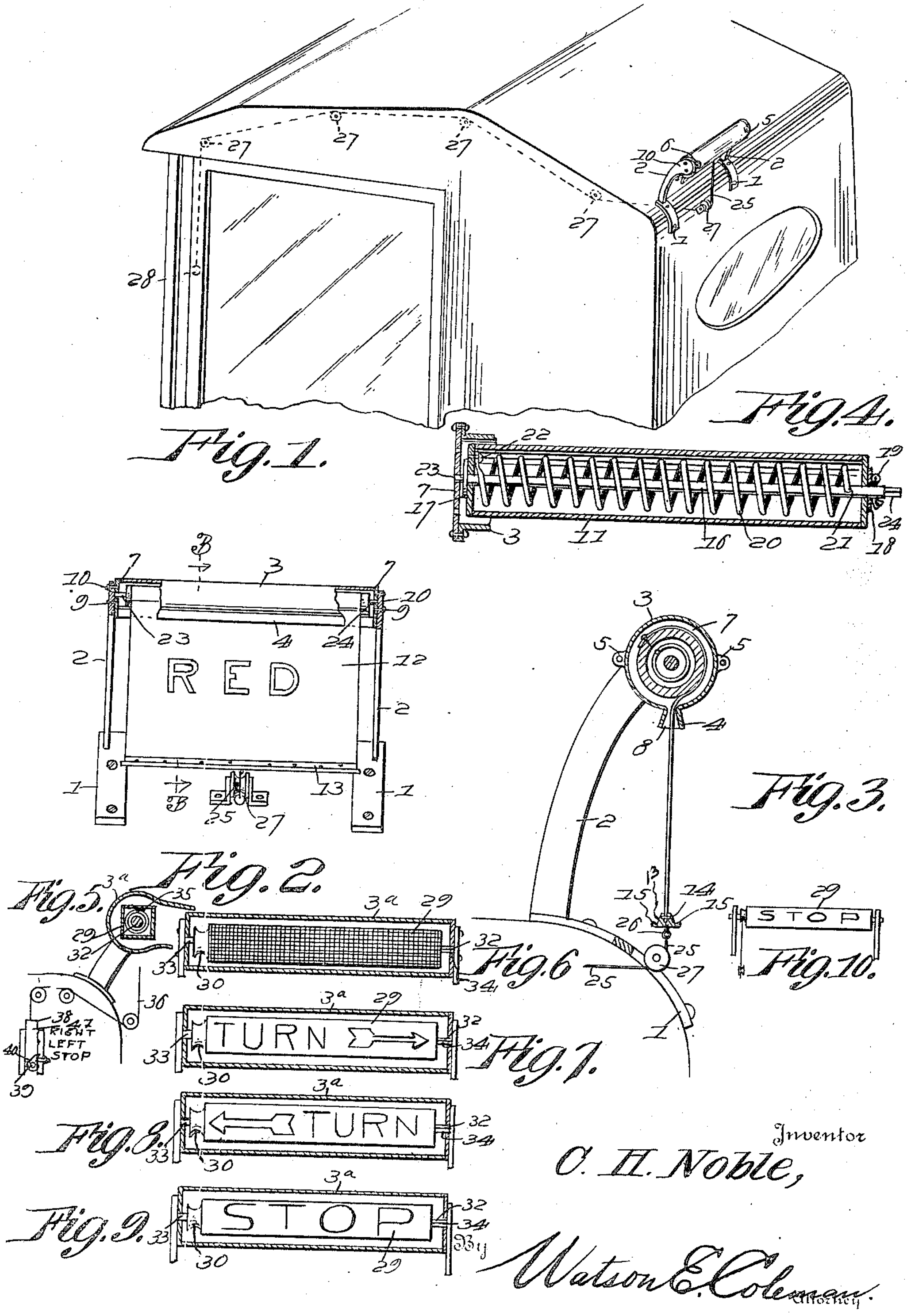
Figure 1 is a view showing the signal as applied to the top of the cover of an automobile, showing the signal proper as encased in the tabular housing or casing.
Figure 2 is a view showing the signal exposed.
Figure 3 is an enlarged detail sectional view of the signal on line 3—3 of Figure 2, showing the signal proper exposed, and showing the actuating cord as connected thereto.
Figure 4 is a longitudinal sectional view through the spring tensioned roller or drum.
Figure 5 is a sectional view through the top of the rear of the cover of an automobile showing the housing in section illustrating a direction signal square in cross section mounted therein, and adapted to have a blank face as neutral, and right and left turn and stop on the other three faces.
Figure 6 is a longitudinal sectional view through the signal shown in Figure 5, showing right turn.
Figure 7 is a view similar to Figure 6 showing left turn.
Figure 8 is a view similar to Figures 6 and 7 showing stop.
Figure 9 is a view similar to Figures 6, 7 and 8 showing a blank face acting as neutral.
Figure 10 is a view showing the casing of Figures 7 to 9 inclusive eliminated.

Referring to the drawings, 1 designates a bracket which is provided with arms 2 extending upwardly and rearwardly. A tubular casing for the signal in Figures 1 to 3 inclusive is provided. This tubular casing 3 consists of a circular sheet metal wall with its adjacent edge portions spaced and terminating in downwardly extending flanges 4, which act to protect the danger signal from the weather. The ends of the casing 3 have diametrically opposite ears 5, to which are fastened ears 6 of the circular end pieces 7, which act to close the ends of the casing. The end pieces have extensions 8 conforming to the disposition of the flanges 4, and are secured to the ends of said flanges in any suitable manner (not shown). However the end pieces 7 are secured by screws 9 on circular extremities 10 of the arms 2, thereby mounting the casing in position.

Mounted in the casing 3 is a roller 11, about which a danger signal 12, preferably colored red is wound, one end of this signal is connected to the roller. The danger signal may be made of any suitable pliable material, such as fabric, preferably silk, though it is obvious that cotton, linen, oil cloth or the like may be used. One end of the pliable danger signal has a strip 13, which is riveted to the pliable signal as at 14, and is designed to contact with the edges of the flanges 4 of the casing 3. In fact the strip 13 is made to fit between the flanges as shown, and is provided with margins 15 which overlie the lower edges of the flanges, thereby protecting the danger signal from the weather. The tubular roller is of metal, and is mounted upon a shaft 16. One end of the shaft has a collar 17 engaged by the roller, there being a washer 18 on the other end of the shaft and held in place by a cotter pin 19, so that the roller may revolve between the collar 17 and the washer. A coil spring 20 surrounds the shaft, and has one end attached to the shaft as at 21, and its other end attached to the tubular roller as at 22. The shaft 16 has a reduced cylindrical pintle 23 engaging a bearing of one of the end pieces 7, while the other end of the shaft has a rectangular pintle 24 engaging the other end piece 7 of the housing. The rectangular pintle 24 prevents the shaft from turning. A suitable cord 25 is attached at 26 to the strip 13, and passes over several rollers 27, and terminates in a handle 28, by which the danger signal or flag may be unreeled from the roller. This flag or curtain danger signal is not only colored red but also has the word "red" thereon, and when exposed is designed to indicate danger. The cord passes through the upper rear portion of the top of the cover, and the rollers 27 over which the cord passes are suspended from the under surface of the cover of the automobile. The handle 28 of the cord is disposed on the interior of the automobile, in close position to the operator or chauffeur, so that by pulling upon the cord the danger or red signal or flag may be exposed. Upon such action of the handle, the spring roller will rewind the curtain or flag or danger signal and the strip 13 will fit between the flanges 4 and limit the curtain or flag danger signal in its rereeling movement.

In Figures 5 to 10 inclusive there is illustrated a direction signal, operated in a manner similar to the danger signal. However in this form of signal a tube 29 square in cross section is mounted in the housing $3^a$, and furthermore this housing is disposed so that its opening faces rearwardly, to expose any one of the faces of the tube. In fact it might be said that the tube is an equivalent of the roller 11, with the exception that it is square in cross section, and is provided with a grooved pulley 30 on one end. The tube 29 has a shaft 32 extending longitudinally therethrough, with its pintles 33 and 34 engaged by the end pieces $7^a$ of the housing $3^a$. The pintle 34 is rectangular, to hold the shaft stationary, and mounted in the tube 29 is a coil spring which surrounds the shaft, with one end attached thereto, and its other end attached to the tube as at 35. One face of the tube 29 is blank and is colored black, or the same color of the top of the cover of the automobile, while two of the other faces have arrows indicating right and left turn, whereas the fourth face is provided with the word stop. A suitable cord 36 is attached to the pulley 30 and wound sufficiently thereabout, so that upon pulling of the cord the tube 29 may be rotated to expose the directions on either one of the faces. For instance the tube is disposed so that its blank or neutral face is normally exposed, therefore when pulling the cord 36 sufficiently the face containing the direction right turn may be exposed, and when pulling the cord 36 further the face containing left turn may be exposed. Upon an additional pull on the cord the face containing the word stop may be exposed. The cord 36 passes over a series of similar pulleys or rollers 27 suspended from the under face of the top of the cover of the automobile, and is connected to the slide 38, which is mounted in guides of a plate 39, which may be secured in close position to the operator or chauffeur. The plate has neutral, right turn, left turn, and stop printed on one side, as a gauge for the movement of the slide. The slide is provided with a dog 40 to engage teeth 41 of the plate, so as to hold the slide opposite any one of the directions on the plate, in order to hold the tube with the desired face thereof exposed.

The invention having been set forth, what is claimed is:—

1. In a signal as set forth, the combination with a tubular housing provided with an elongated opening, of a support therefor, a tensioned roller mounted in bearings of the housing, a pliable signal wound about the roller and having one end attached thereto, and means at the other end of the signal adapted to contact with the wall of the housing when the signal is automatically rewound, thereby limiting the signal in its rewinding movement and closing said opening, thereby precluding foreign matter.

2. In a signal as set forth, the combination with a tubular housing provided with an elongated opening, of a support therefor, a tensioned roller mounted in bearings of the housing, a pliable signal wound about the roller and having one end attached thereto, and means at the other end of the signal adapted to contact with the wall of the housing when the signal is automatically rewound, thereby limiting the signal in its rewinding movement and closing said opening, thereby precluding foreign matter, and means attached to said limiting means of the signal, for actuating the signal to its exposed position.

3. In a signal, the combination with a tubular housing having an elongated opening in its small portion with opposed flanges on opposite sides of said opening, of supports for the ends of the housing, end pieces secured to the supports, means for connecting the end pieces to the ends of the housing, a tensioned roller mounted in bearings of said end pieces and containing a traffic warning or signal, and means for actuating said roller.

4. In a signal, the combination with a tubular housing having an elongated opening in its small portion with opposed flanges on opposite sides of said opening, of a support for the housing, end pieces secured to the arms of said support, a tensioned roller having pintles journaled in bearings of said end pieces, a pliable signal wound about the roller, means attached to one end of the signal and adapted to operatively engage with said opposed flanges to limit the roller in its rereeling movement, means operatively connected to said limiting means for unreeling said signal.

5. In combination, a housing, a support therefor, said housing having an elongated opening in its wall adapted to face rearwardly, the upper and lower margins of said opening having long and short flanges, the former overlying and protruding beyond the latter, a tensioned roller journaled in bearings of said housing, and being square in cross-section, and having one longitudinal face blank acting as neutral, and provided with right and left turn and stop on the other three faces, a pulley formed on one end of the roller, and an actuating cord connected to said roller and wound thereabout for revolving the roller.

In testimony whereof I hereunto affix my signature.

CHARLES H. NOBLE.